United States Patent

Katayama et al.

[11] Patent Number: 6,132,647
[45] Date of Patent: Oct. 17, 2000

[54] BLUE LIGHT EMITTING MATERIAL, ELECTROLUMINESCENT DEVICE USING SAME AND METHOD OF MANUFACTURING THE ELECTROLUMINESCENT DEVICE

[75] Inventors: Masayuki Katayama, Handa; Akira Kato, Kariya; Atsushi Mizutani, Anjo; Nobuei Ito, Chiryu; Tadashi Hattori, Okazaki, all of Japan

[73] Assignee: Denso Corporation, Kariya, Japan

[21] Appl. No.: 09/330,604

[22] Filed: Jun. 11, 1999

Related U.S. Application Data

[62] Division of application No. 08/883,231, Jun. 26, 1997, Pat. No. 5,955,210.

[30] Foreign Application Priority Data

Jun. 28, 1996 [JP] Japan .................................. 8-170167

[51] Int. Cl.[7] .............................. H01B 1/08; C09K 11/08
[52] U.S. Cl. .................... 252/519.14; 252/584; 252/586; 252/301.45
[58] Field of Search ........................ 252/519.14, 519.15, 252/584, 586, 301.4 S, 301.6 R

[56] References Cited

U.S. PATENT DOCUMENTS

| 5,309,070 | 5/1994 | Sun et al. . |
| 5,747,929 | 5/1998 | Kato . |
| 5,780,966 | 7/1998 | Kato et al. ............................... 313/506 |
| 6,004,618 | 12/1999 | Mizutani et al. ......................... 427/66 |

FOREIGN PATENT DOCUMENTS

| 667 383 A2 | 8/1995 | European Pat. Off. . |
| 2-72592 | 3/1990 | Japan . |
| 8-162273A2 | 6/1996 | Japan . |

OTHER PUBLICATIONS

Moss et al "Improving the diversity of manufacturing electroluminescent . . . " Int. SAMPE Tech. Conf. (1995) 27 pp. 507–515 (Abstract).
Patent Abstracts of Japan, 09007769, Oct. 1997, Hattori.
Patent Abstracts of Japan, 002061410, May. 1996, Derwent.
D. C. Smith, et al. "Late–News Paper: Crystalline–As–Deposited $CaGa_2S_4$:Ce Via Low–Temperature Metal–Organic Chemical Vapor Deposition", SID 95 Digest, 1995, pp. 728–731.

*Primary Examiner*—Mark Kopec
*Attorney, Agent, or Firm*—Pillsbury Madison & Sutro LLP

[57] ABSTRACT

In an EL device in which a blue light emitting material obtained by doping Ce as a luminescent center into $CaGa_XS_Y$ host material is used for a luminescent layer, values of X and Y in the $CaGa_XS_Y$ host material are set in ranges of $1.4 \leq X \leq 1.9$, $2.9 \leq Y \leq 3.8$. The blue light emitting material thus obtained has a new structure defined by the fact that an X-ray diffraction spectrum obtained by using Cu Kα radiation as a X-ray source has at least one peak in diffraction angles of 13.5±0.2 degree, 14.6±0.2 degree and 25.7±0.2 degree. The blue light emitting EL device has a luminance higher than that of a conventional EL device.

2 Claims, 9 Drawing Sheets

BLUE LIGHT EMITTING MATERIAL, ELECTROLUMINESCENT DEVICE USING SAME AND METHOD OF MANUFACTURING THE ELECTROLUMINESCENT DEVICE

This is a division of application Ser. No. 08/883,231, filed Jun. 26, 1997 now U.S Pat. No. 5,955,210.

CROSS REFERENCE TO RELATED APPLICATION

This application is based upon and claims the benefit of priority of the prior Japanese Patent Application No. 8-170167 filed on Jun. 28, 1996, the contents of which are incorporated herein by reference.

BACKGROUND OF THE INVENTION

1. Field of the Invention

The present invention relates to a blue light emitting material having a new crystal structure, an electroluminescent device utilizing the same and a method for manufacturing the electroluminescent device.

2. Related Art

Conventionally, an electroluminescent device is formed by sequentially laminating a first electrode, a first insulating layer, a luminescent layer, a second insulating layer and a second electrode on a glass substrate which is an insulative substrate, and at least a light outgoing side from the luminescent layer is formed by materials which are optically transparent.

The luminescent layer is formed by doping a luminescent center in a host material, and various kinds of materials have been suggested as materials for those. For example, Japanese Patent Application Laid-Open No. 2-72592 or Japanese Patent Application Laid-Open No. 5-65478 discloses calcium digallium tetrasulfide in which cerium has been doped ($CaGa_2S_4$:Ce) or strontium digallium tetrasulfide in which cerium has been doped ($SrGa_2S_4$:Ce), as a material for the luminescent layer.

In a case where a composition material composed of three elements such as $CaGa_2S_4$ or $SrGa_2S_4$ which is a host material of the luminescent layer is used as the luminescent layer of the electroluminescent device, annealing treatment is performed at a temperature of 600 to 650° C. after formation of the luminescent layer in order to improve crystallinity thereof. It is to be noted that the reason why an upper temperature in the annealing treatment is 650° C. is that, if the annealing treatment is performed at a temperature higher than that, a great deal of distortion is given rise to the glass substrate.

Even if the annealing treatment is performed at the above temperature, however, the crystallinity of the luminescent layer formed by $CaGa_2S_4$ or $SrGa_2S_4$ is far worse than that of a luminescent layer in which zinc sulfide (ZnS) or strontium sulfide (SrS) is used as a host material. For this reason, it is very difficult to realize an electroluminescent device having a sufficient luminance on a practical use by utilizing the $CaGa_2S_4$:Ce or $SrGa_2S_4$:Ce luminescent layer.

SUMMARY OF THE INVENTION

In view of the above problems of the prior art, it is an object of the present invention to provide a new blue light emitting material in which a luminance of emitting light is enhanced, a high-luminance blue-light emitting electroluminescent device by the use of that material, and a manufacturing method thereof.

The present inventors assiduously conducted experiments, assuming that crystallinity of a host material can be enhanced by strictly controlling each composition of the host material in which three elements of calcium (Ca), gallium (Ga) and sulfur (S) are main components. As a result, the present inventors found out that a luminance of light emitting from a luminescent layer is increased when a composition rate of each component in the host material is controlled to a specified rate. When an X-ray diffraction spectrum of the host material is analyzed, it is ascertained that the X-ray diffraction spectrum has peaks at different diffraction angles from those of an X-ray diffraction spectrum of a conventional $CaGa_2S_4$ material.

A blue light emitting material that is made based on such a examination has cerium (Ce) as a luminescent center doped in a host material of which main components are calcium (Ca), gallium (Ga) and sulfur (S). An X-ray diffraction spectrum of the blue light emitting material has at least one peak in diffraction angles of 13.5±0.2 degree, 14.6±0.2 degree, and 25.7±0.2 degree in a case where Cu Kα radiation is used as an X-ray source.

Also, when a chemical formula of the host material is expressed in a form of $CaGa_XS_Y$, a range of X is not less than 1.4 nor more than 1.9 and a range of Y is not less than 2.9 nor more than 3.8.

Further, a, b, c, α, β, γ in a lattice constant of a crystal of the host material meet conditions such that α=β=γ=90°, and a, b, and c are substantially equal to one another.

The blue light emitting material having such features has not existed before and can achieve high-luminance light emission.

The above-described blue light emitting material can be used for a luminescent layer in an electroluminescent device. In this case, comparing to a case where a conventional $CaGa_2S_4$ material is used as the luminescent layer, a luminance of emitting light can be enhanced.

On top of which, when a ratio ($I_2/I_1$) of intensity $I_2$ of the peak of 25.7±0.2 degree relative to intensity $I_1$ of the peak of 14.6±0.2 degree in the X-ray diffraction spectrum is set to be equal to or greater than 0.2, the crystallinity of the material is further enhanced so that the luminance of emitting light is intensified.

In the present invention, zinc (Zn) is doped in the luminescent layer in the vicinity of at least one of interfaces between the luminescent layer and first and second insulating layers. Due to doping of zinc (Zn), the luminance of emitting light can be increased.

In this case, the doping of zinc (Zn) can be performed by interposing a zinc sulfide (ZnS) layer in at least one of regions between the luminescent layer and the first and second insulating layers and causing zinc (Zn) to diffuse from the zinc sulfide (ZnS) layer into the luminescent layer.

It is preferable that a thickness of the zinc sulfide (ZnS) layer is in a range of not less than 30 nm nor more than 80 nm. When the zinc sulfide layer is too thin, it is considered that diffusion of zinc (Zn) becomes insufficient, on the other hand, when the zinc sulfide layer is too thick, enough voltage can not be applied to the luminescent layer. That is, when the thickness of the zinc sulfide layer is out of the range described above, the luminance is decreased.

The electroluminescent device as described above can be manufactured with the following method.

When zinc (Zn) is intended to be doped in the luminescent layer, after forming a zinc sulfide (ZnS) layer in at least one of regions between the luminescent layer and the first and second insulating layers, annealing treatment is performed to diffuse zinc (Zn) from the zinc sulfide (ZnS) layer into the luminescent layer. Otherwise, a chemical vapor deposition technique can be utilized such that precursors for the host material of the luminescent layer and for the luminescent center are each supplied in a reactor, and further zinc (Zn) precursor is supplied in the reactor. It is to be noted that if the zinc (Zn) precursor is supplied in at least one of an initial stage and an ending stage of formation of the luminescent layer, zinc (Zn) is doped in the luminescent layer in the vicinity of at least one of interfaces between the luminescent layer and the first and second insulating layers.

In the chemical vapor deposition technique, if nozzles spraying the precursors are formed in a slit-like shape and a length of the slit in its longitudinal direction is set to be longer than a maximum diagonal line or a diameter of said substrate, a film having an uniform thickness can be formed on the entire area of the substrate. In this case, if the substrate is rotated, an uniformity of the film thickness can be further improved.

Further, in the chemical vapor deposition technique, the precursors are supplied by mixing specified precursors. In more detail, zinc precursor and gallium precursor, and calcium precursor and precursor for the luminescent center are mixed respectively, and then the mixed precursors are supplied separately. As a result, it can prevented that the precursors react with one another before reaching the substrate.

Furthermore, if annealing treatment is performed after a second insulating layer is formed, the electroluminescent device in which a threshold value for light emission is lowered can be manufactured.

BRIEF DESCRIPTION OF THE DRAWINGS

These and other objects, features and characteristics of the present invention will be appreciated from a study of the following detailed description, the appended claims and drawings, all of which form a part of this application. In the drawings:

DETAILED DESCRIPTION OF THE PREFERRED EMBODIMENTS

The embodiments of the present invention will be explained hereinafter with reference to the drawings.
(First Embodiment)

Figure 1:
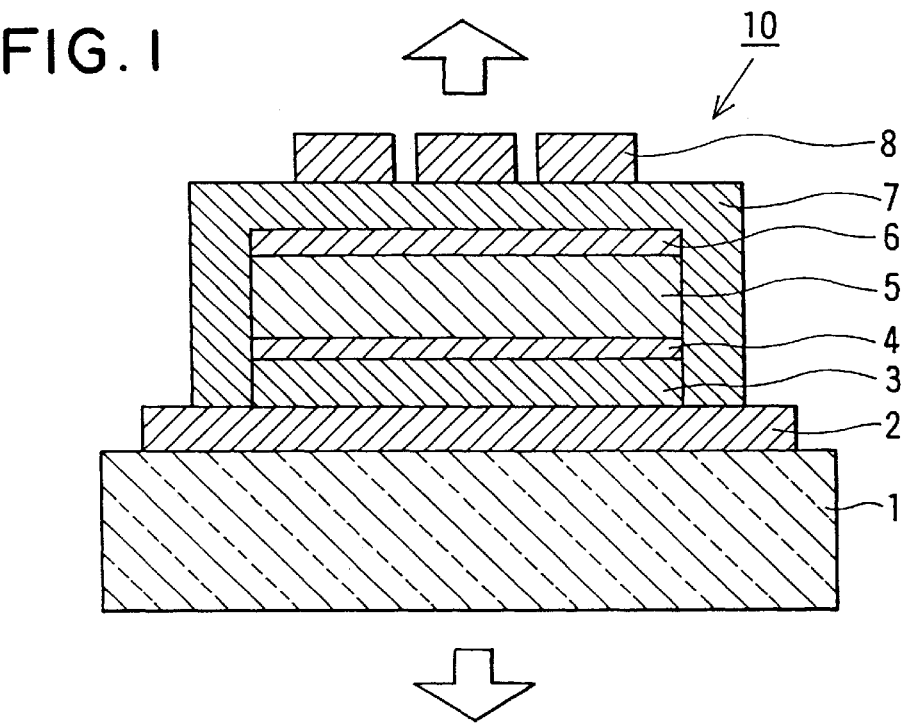
FIG. 1 is a schematic view illustrating a vertical cross section of an electroluminescent device according to a first embodiment of the present invention.

FIG. 1 is a schematic view showing the cross section of an electroluminescent device 10 according to the present invention. It is to be noted that light goes out along a direction of an arrow in the electroluminescent device 10 in FIG. 1.

The thin film electroluminescent device 10 is structured by sequentially laminating the following thin layers on a glass substrate 1 which is an insulative substrate. It is to be noted that a thickness of each layer will be described with respect to a center portion thereof.

On the glass substrate 1, a first transparent electrode (first electrode) 2 made of an optically transparent ITO (Indium Tin Oxide) layer, on the upper surface thereof, a first insulating layer 3 made of an optically transparent ATO layer ($Al_2O_3/TiO_2$ alternating layer), a first zinc sulfide (ZnS) layer 4 to diffuse zinc (Zn) into a luminescent layer 5 in the vicinity of an interface with the first insulating layer 3, the luminescent layer 5 made of $CaGa_XS_Y$ ($1.4 \leq X \leq 1.9$, $2.9 \leq Y \leq 3.8$) with cerium (Ce) doped therein as a luminescent center, a second ZnS layer 6 to diffuse zinc (Zn) into the luminescent layer 5 in the vicinity of an interface with a second insulating layer 7, the second insulating layer 7 made of an optically transparent ATO layer ($Al_2O_3/TiO_2$ alternating layer), and a second transparent electrode (second electrode) 8 made of optically transparent zinc oxide are formed. The first and second transparent electrodes 2 and 8 are arranged into a matrix shape.

Next, a manufacturing method of the above-described thin film electroluminescent device 10 will be described hereinafter.

First, the first transparent electrode 2 is formed on the glass substrate 1 by a sputtering method. In more detail, while a temperature of the glass substrate 1 is kept to a constant value, the inside of a sputtering apparatus is evacuated to a vacuum. Thereafter, a mixed gas of argon (Ar) and oxygen ($O_2$) is introduced in the sputtering apparatus, and then film formation is performed with a radio-frequency power of 1 kw.

Next, on the first transparent electrode 2, the first insulating layer 3 made of an ATO layer ($Al_2O_3/TiO_2$ alternating layer) is formed by an ALE (atomic layer epitaxy) method.

In more detail, while the temperature of the glass substrate is kept to a constant value, the inside of the ALE apparatus is evacuated to a vacuum. Thereafter, each gas of aluminium trichloride ($AlCl_3$) and water ($H_2O$) is alternately introduced more than one hundred times in the ALE apparatus, whereby the $Al_2O_3$ film is formed. Next, the supply of $AlCl_3$ is temporarily suspended, and each gas of titanium tetrachloride ($TiCl_4$) and water ($H_2O$) is alternately introduced approximately one hundred times instead, whereby the $TiO_2$ film is formed. The formations of the $Al_2O_3$ film and the $TiO_2$ film are alternately repeated approximately forty times, so that the $Al_2O_3/TiO_2$ alternating layer is formed. It is to be noted that the $Al_2O_3$ film is formed as the last film, i.e., the film right before forming the first ZnS layer 4. This is because the $Al_2O_3$ film does not give an adverse effect to a crystal structure of an interface with the first ZnS layer 4.

Figure 2:
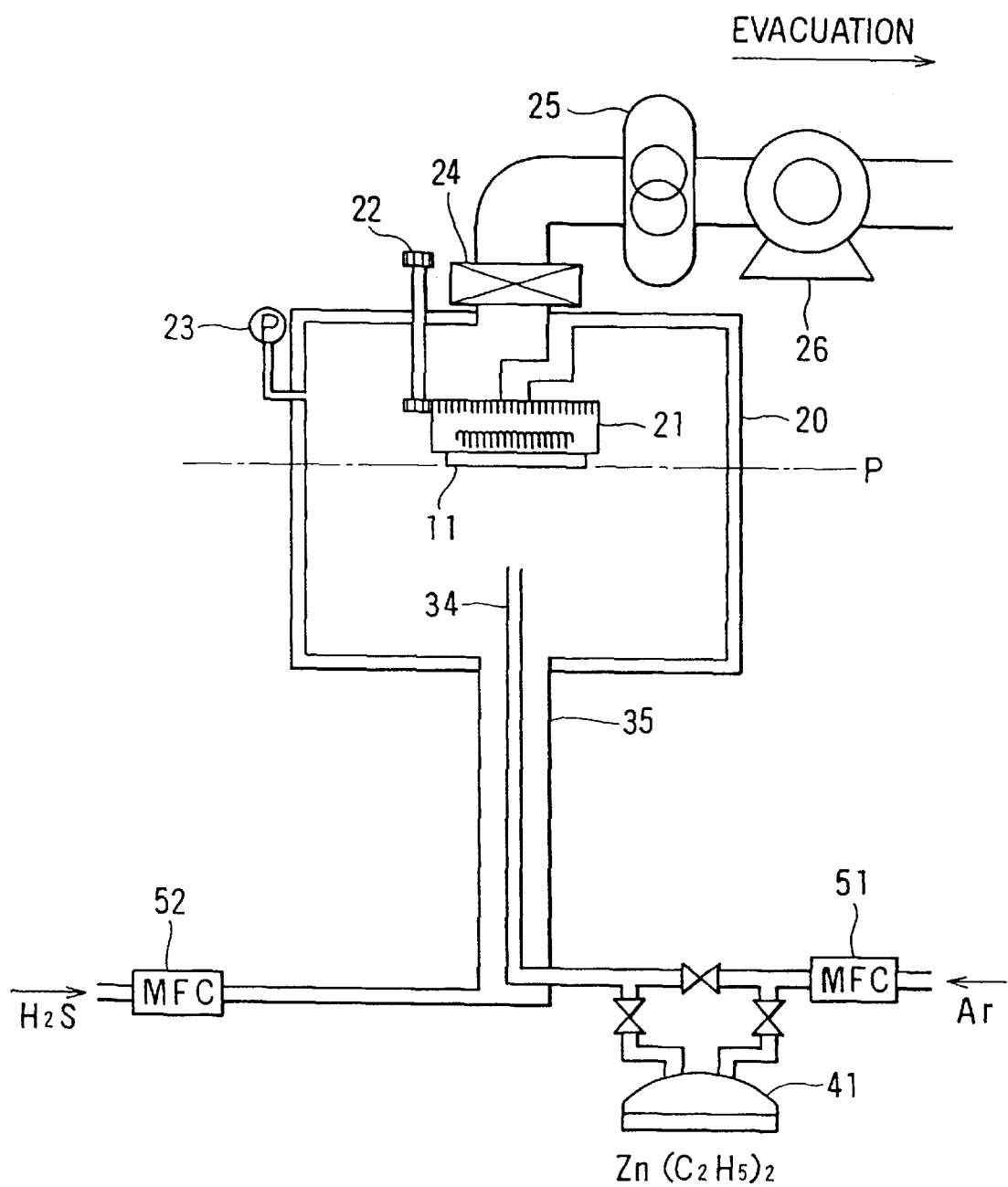
FIG. 2 is a schematic view illustrating an example of configuration of a manufacturing apparatus in the first embodiment of the present invention.

Subsequently, the first ZnS layer 4 which becomes diffusion source of Zn is formed on the first insulating layer 3 by a metal organic chemical vapor deposition (MOCVD) method with the use of an MOCVD apparatus illustrated in FIG. 2 (which shows a schematic structure thereof).

In more detail, the glass substrate 11 on which the first electrode 2 and the first insulating layer 3 have been formed is set in a susceptor 21 capable of controlling its rotational speed. The susceptor 21 is rotated at 5 rpm through a rotation control stick 22. Then, while the glass substrate 11 is subject to a constant temperature of 450° C., an evacuated quantity is controlled by a pressure adjusting device (not shown) so that the inside of a film-formation chamber (reactor) 20 becomes a pressure-reduced atmosphere of 2 Torr, which is detected by a pressure gage 23. Evacuation of gas is performed by a rotary pump 26 and a mechanical booster pump 25 through a gate valve 24. Thereafter, diethylzinc (Zn $(C_2H_5)_2$) and hydrogen sulfide ($H_2S$) are introduced into the film-formation chamber 20 from nozzles 34 and 35, respectively, by making use of argon (Ar) career gas, whereby the first ZnS layer 4 is formed.

In more detail, diethylzinc ($Zn(C_2H_5)_2$) filled in a liquid material container 41 is kept to a temperature of 17° C., and then gasified diethylzinc ($Zn(C_2H_5)_2$) is conveyed into the reactor 20 by Ar career gas of which flow rate is adjusted by a mass flow controller (MFC) 51. Precursor of diethylzinc ($Zn(C_2H_5)_2$) is supplied to the glass substrate 11 from a gaseous material supplying nozzle 34. The MFC is a well-known flow control device in which flow rate of gas is regulated to an instructed value based on an instructed flow rate provided to a controller (not shown).

After hydrogen sulfide ($H_2S$) is diluted with Ar, flow rate of gaseous hydrogen sulfide is directly controlled by a mass flow controller 52. Gaseous hydrogen sulfide is introduced into the reactor 20 from a gaseous material supplying nozzle 35 and is supplied to the glass substrate 11.

Figure 3:
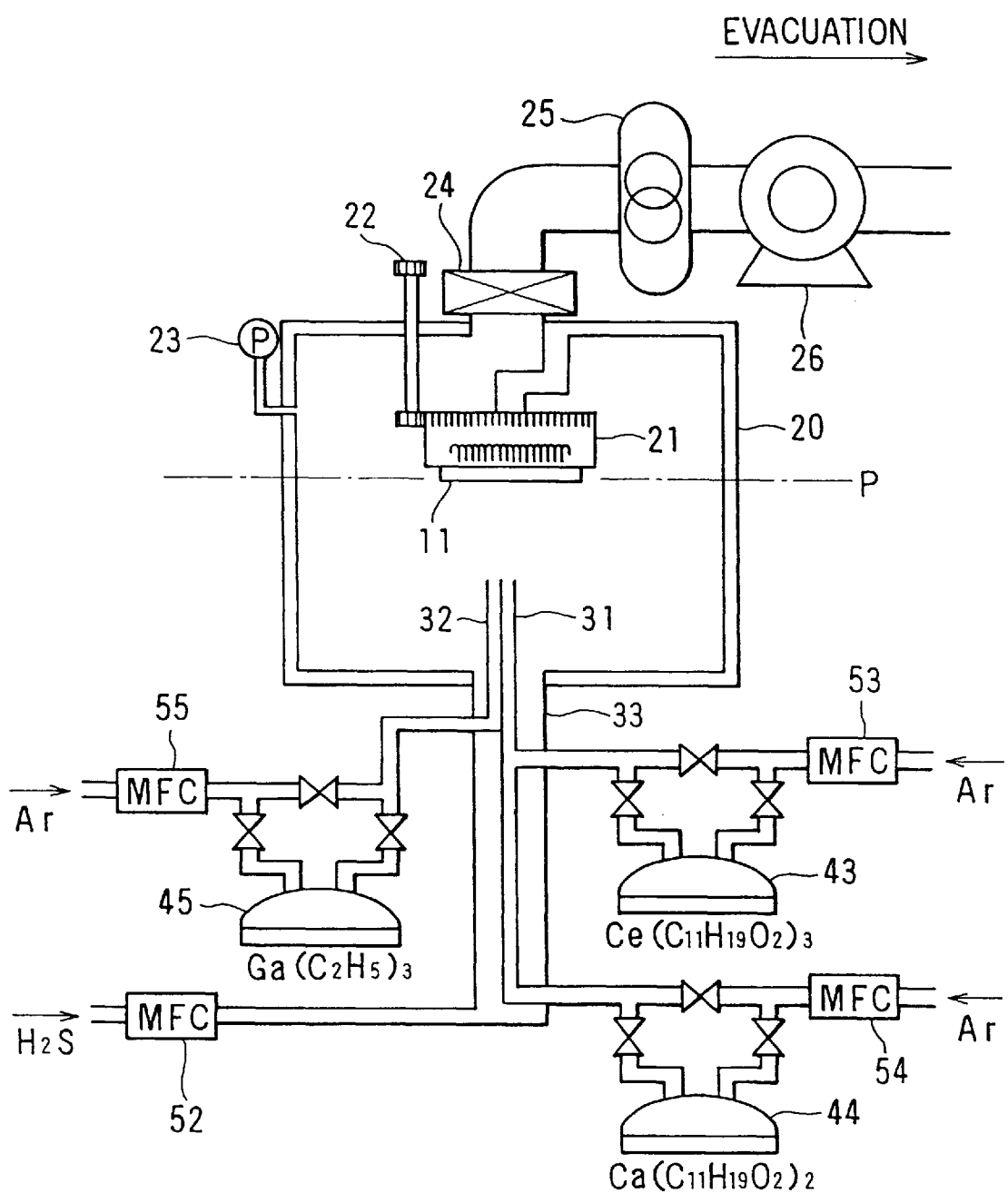
FIG. 3 is a schematic view illustrating an example of configuration of a manufacturing apparatus in the first embodiment of the present invention.

Next, a $CaGa_XS_Y$ luminescent layer 5 ($1.4 \leq X \leq 1.9$, $2.9 \leq Y \leq 3.8$) with cerium (Ce) doped therein as a luminescent center is formed on the first ZnS layer 4 by an MOCVD method with the use of an MOCVD apparatus illustrated in FIG. 3 (which shows a schematic structure thereof).

It is to be noted that although the MOCVD apparatus is shown in two figures (FIG. 2 and FIG. 3) for convenience, the parts to which the same numbers are attached are common in one MOCVD apparatus. In the MOCVD apparatus, the susceptor 21 is capable of moving from an upper side of the nozzles 34 and 35 (in FIG. 2) disposed in the reactor 20 to an upper side of nozzles 31, 32 and 33 (in FIG. 3) and both upper sides can be separated by a gate (not shown). Also, because the susceptor 21 and the substrate 11 are rotated on a plane P which is apart by an equal distance from each tip portion of the nozzles 31, 32, 33, 34 and 35, a film having an uniform thickness can be formed on an entire area of the substrate 11.

Figure 4:
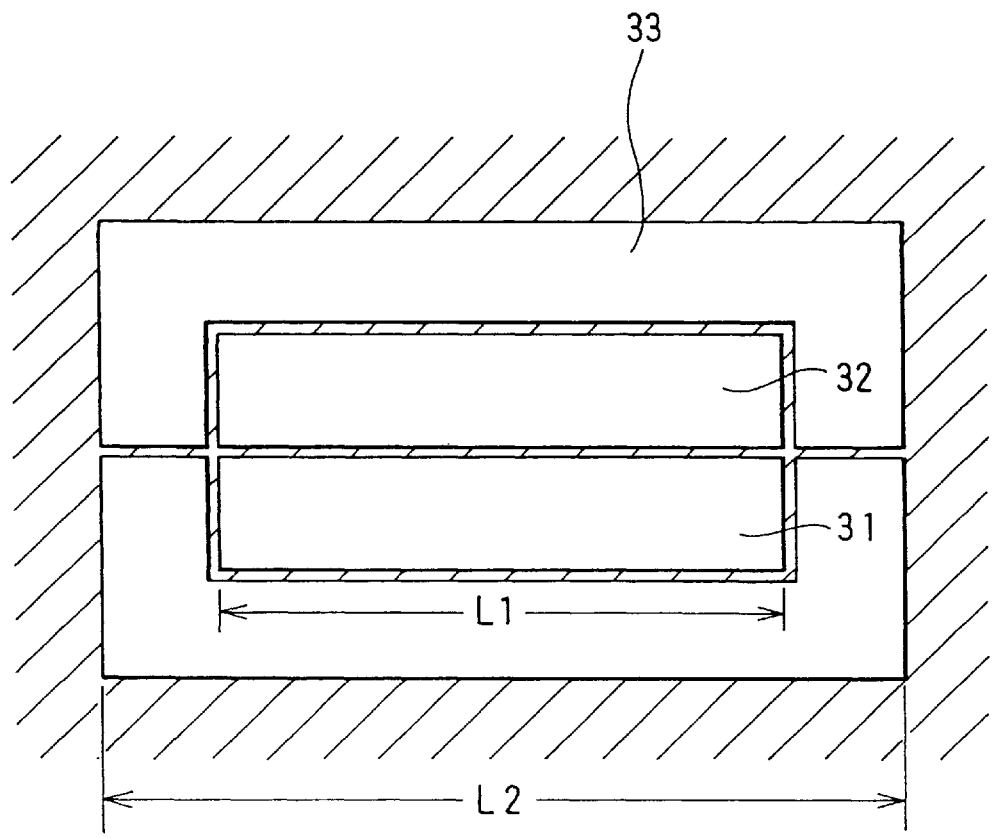
FIG. 4 is a plane view illustrating a shape of each of nozzles in the manufacturing apparatus in the first and second embodiments of the present invention.
Figure 5:
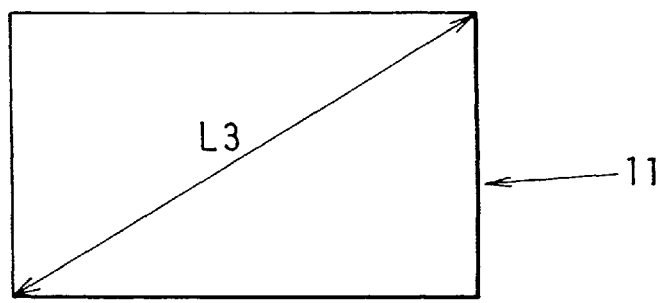
FIG. 5 is a plane view of a substrate in the first and second embodiments of the present invention.

As shown in FIG. 4, when the nozzles 31, 32 and 33 are viewed from above, the nozzles 31 to 33 are rectangle, i.e., in a shape of a slit. The length L1, L2 of each of slits in its longitudinal direction is set to be longer than a maximum length L3 of a diagonal line of the substrate 11 illustrated in FIG. 5. Because a slit length of the nozzle is longer than the substrate 11, when the substrate 11 is rotated on the plane P, a film having an uniform thickness can be formed on an entire area of the substrate 11. It is to be noted that if the substrate 11 has a shape of a disc, the slit length of the nozzle may be longer than a diameter of the substrate 11.

In more detail, after the glass substrate 11, on which the first ZnS layer 4 is formed, is moved in a vacuum atmosphere on a side of the MOCVD apparatus illustrated in FIG. 3, the glass substrate 11 is set on the susceptor 21 capable of controlling its rotational speed. Then, the susceptor 21 is rotated at 5 rpm through the rotation control stick 22. Thereafter, the temperature of the glass substrate 11 is kept at a constant temperature of 534° C. and an evacuated quantity is controlled by a pressure adjusting device (not shown) so that the inside of the film-formation chamber 20 becomes a pressure-reduced atmosphere of 50 Torr, which is detected by the pressure gage 23. Evacuation of gas is performed by the rotary pump 26 and the mechanical booster pump 25 through the gate valve 24.

Thereafter, $Ca(thd)_2$ (thd=2,2,6,6-tetramethyl-3, 5-heptanedione: $C_{11}H_{19}O_2$) and $Ce(thd)_3$ ($Ce(C_{11}H_{19}O_2)_3$) which is gaseous material for the luminescent center, triethylgallium ($Ga(C_2H_5)_3$), and hydrogen sulfide ($H_2S$) are introduced in the reactor 20 from the nozzles 31, 32 and 33, respectively, by the use of argon (Ar) career gas, thereby forming a $CaGa_XS_Y$:Ce luminescent layer. It is to be noted that because both of $Ca(thd)_2$ ($Ca(C_{11}H_{19}O_2)_2$) and $Ce(thd)_3$ ($Ce(C_{11}H_{19}O_2)_3$) has β-diketone radical ($C_{11}H_{19}O_2$), they do not react to each other when being mixed in advance. Therefore, they are mixed in advance and supplied from the common nozzle 31.

In more detail, $Ca(thd)_2$ filled in a solid material container 44 is heated at 220° C. for sublimation. Gasified material (precursor) is conveyed into the reactor 20 by Ar career gas of which flow rate is adjusted by a mass flow controller 54 illustrated in FIG. 3, and then precursor is supplied to the glass substrate 11 from the precursor supplying nozzle 31.

Simultaneously, triethylgallium filled in a liquid material container 45 is insulated at a constant temperature of 12° C. Gasified triethlygallium is conveyed into the reactor 20 by Ar career gas of which flow rate is adjusted by a mass flow controller 55 illustrated in FIG. 3, and then precursor of triethylgallium is supplied to the glass substrate 11 from the precursor supplying nozzle 32.

After hydrogen sulfide is diluted by argon (Ar), flow rate of hydrogen sulfide is directly adjusted by a mass flow controller 52. In this way, hydrogen sulfide is introduced in the reactor 20 and supplied to the glass substrate 11 from the precursor supplying nozzle 33.

Doping of the luminescent center is performed in such a way that $Ce(thd)_3$ filled in the solid material container 43 is used as material for the luminescent center. That is, the temperature inside the solid material container 43 is insulated at a constant value of 155° C. to sublime the material filled therein. Then, sublimed $Ce(thd)_3$ is conveyed into the reactor 20 by Ar career gas of which flow rate is adjusted by the mass flow controller 53, so that precursor of $Ce(thd)_3$ is supplied to the glass substrate 11 from the precursor supplying nozzle 31.

In this way, because each precursor is separately introduced in the reactor 20 via the corresponding mass flow controller, composition rate of each component of the luminescent layer 5 can be precisely and easily controlled. Supplying amount of each precursor is controlled so that the values of X and Y in the $CaGa_XS_Y$ luminescent layer 5 fall in ranges such as $1.4 \leq X \leq 1.9$, $2.9 \leq Y \leq 3.8$.

It became apparent from an experiment conducted by the present inventors that a group II element such as Ca and Zn is apt to react with a group VI element such as S. For this reason, to cause each precursor to react in the vicinity of the surface of the glass substrate 11, gas flowing speed of the precursor supplying nozzle 31 from which $Ca(thd)_2$ of a group II material is supplied is set to be higher than at least gas flowing speed of the nozzle 33 for supplying $H_2S$ of a group VI material.

It is to be noted that $Ca(thd)_2$ ($Ca(C_{11}H_{19}O_2)_2$) was used for Ca material in the first embodiment, however, in addition to that, $Ca(thd)_2$-tetraethylenepentamine adduct ($Ca(C_{11}H_{19}O_2)_2$ $(C_8N_5H_{23})_2$), $Ca(thd)_2$-triethylenetetramine adduct ($Ca(C_{11}H_{19}O_2)_2$ $(C_6N_4H_{18})_2$) or the like can be used in the same way.

Triethylgallium ($Ga(C_2H_5)_3$) was used for Ga material, in addition to that, alkylgallium such as trimethylgallium ($Ga(CH_3)_3$) can be used in the same way.

Further, although hydrogen sulfide ($H_2S$) was used for S material, diethylsulfide ($S(C_2H_5)_2$), methylmercaptan ($CH_3SH$), ditertiarybutylsulfide ($(t-C_4H_9)_2S$) or the like may be used in the same manner.

Next, a second ZnS layer 6 which becomes a diffusion source for Zn is formed on the luminescent layer 5 in the same manner as that for the first ZnS layer 4. Further, the second insulating layer 7 made of an ATO layer ($Al_2O_3/TiO_2$ alternating layer) is formed on the second ZnS layer 6 in the same manner as that for the first insulating layer 3.

After the second insulating layer 7 is formed on the glass substrate 11, the glass substrate 11 is subject to an annealing treatment which is performed in an atmosphere of argon containing $H_2S$ in a percentage of 20%, at a temperature of 650° C. and for one minute. This treatment has an effect to cause luminance of the luminescent layer 5 to enhance by diffusing Zn from the first and second ZnS layers 4 and 6 into the $CaGa_XS_Y$:Ce luminescent layer 5. To confirm the effect, a distribution of Zn in a depth direction of the luminescent layer 5 was measured by a secondary ion mass spectrometry (SIMS).

Figure 6:
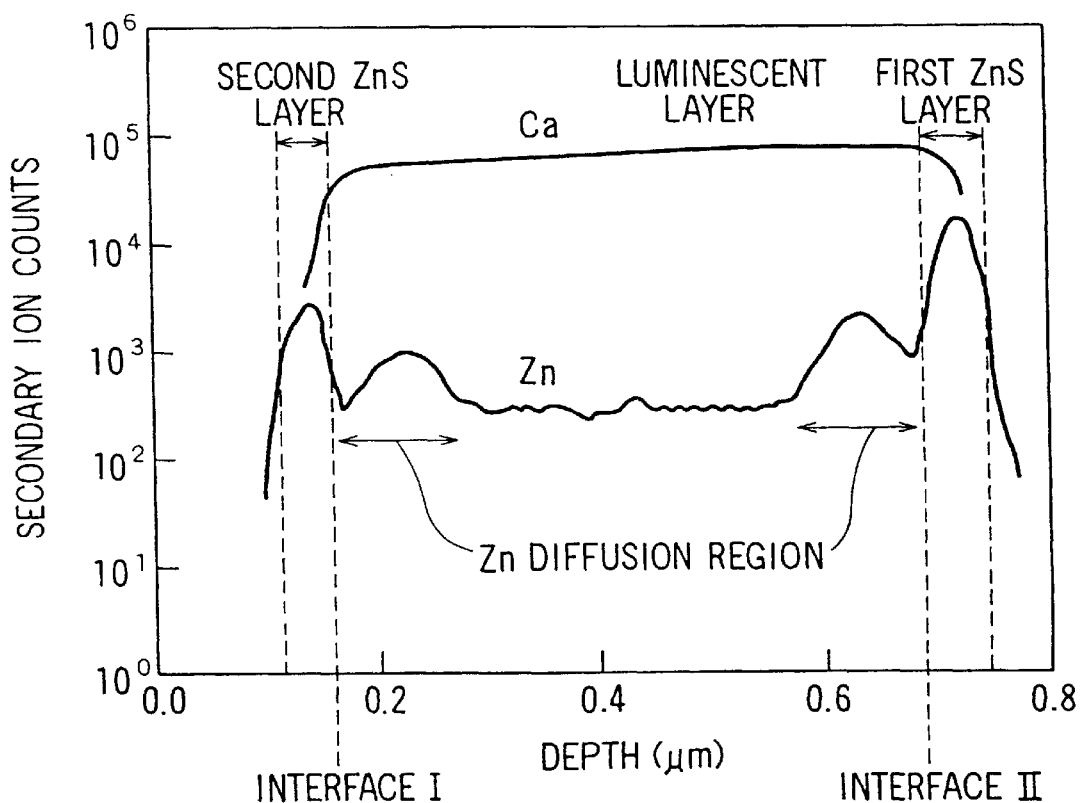
FIG. 6 is a graph illustrating Zn distribution in a luminescent layer in the first and second embodiments of the present invention.

The measured results are illustrated in FIG. 6. In FIG. 6, atomic concentration of each of Ca and Zn in the luminescent layer 5 and first and second ZnS layers 4 and 6 is represented by a value counting secondary ions, an interval between interfaces I and II corresponds to the luminescent layer 5 and the both sides of the interval correspond to the first and second ZnS layers 4 and 6. As shown in FIG. 6, it was confirmed that Zn was diffused from the first and second ZnS layers 4 and 6 into the $CaGa_XS_Y$:Ce luminescent layer 5 so that a Zn diffusion region was formed therein.

Subsequently, the second transparent electrode 8 made of zinc oxide (ZnO) is formed on the second insulating layer 7. Material to be deposited is obtained by mixing a powder of zinc oxide with gallium oxide ($Ga_2O$) and then forming the resultant material in a shape of a pellet and an ion-plating apparatus is used as a film-formation apparatus.

In more detail, while the glass substrate 11 on which the second insulating layer 7 is formed is insulated at a constant temperature, the inside of the ion-plating apparatus is evacuated to a vacuum. After that, Ar gas is introduced inside the ion-plating apparatus, while keeping pressure therein at a constant value. Beam power and radio-frequency power of the ion-plating apparatus is controlled so that a film-formation rate falls into a range of not less than 6 nm/min nor more than 18 nm/min.

The thicknesses of the first transparent electrode 2, the first and second insulating layers 3 and 7, the first and second ZnS layers 4 and 6, the luminescent layer 5, and the second transparent electrode 8 are 200 nm, 300 nm, 40 nm, 550 nm and 450 nm, respectively.

Figure 7:
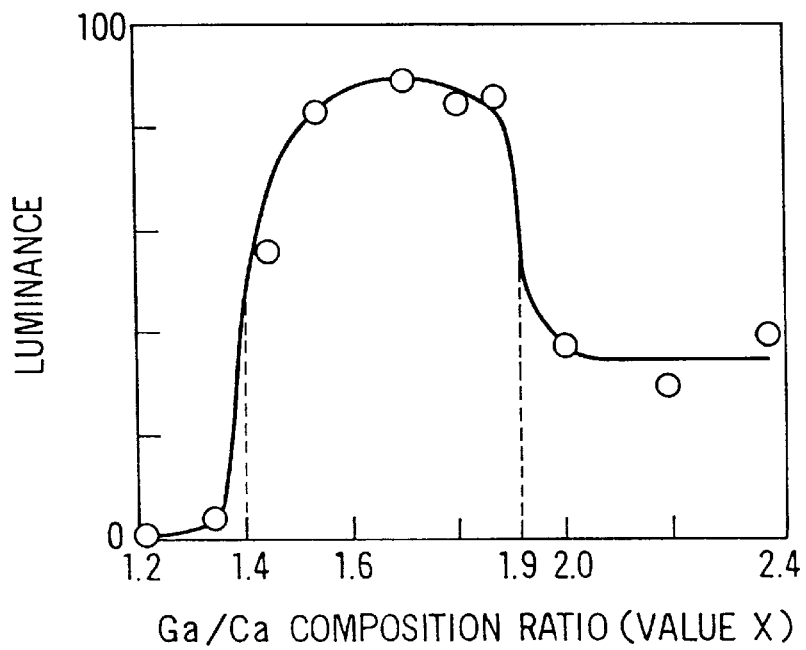
FIG. 7 is a graph illustrating a relationship between a luminance of blue light emission and Ga/Ca composition rate of the luminescent layer according to the first embodiment of the present invention.

A relationship between a Ga/Ca composition ratio (a value of X) in the $CaGa_XS_Y$:Ce luminescent layer 5 and a blue light luminance is shown in FIG. 7. The composition of the luminescent layer 5 is measured by the Rutherford backscattering spectrometry (RSB).

As understood from FIG. 7, when the Ga/Ca composition ratio (X value) is in the range of $1.4 \leq X \leq 1.9$, a high blue light luminance can be obtained comparing to the other range of the composition ratio. At this time, an S/Ca composition ratio (a value of Y) is in a range of $2.9 \leq Y \leq 3.8$ in response to the Ga/Ca composition ratio, and S deficiency do not occur.

Figure 8A:
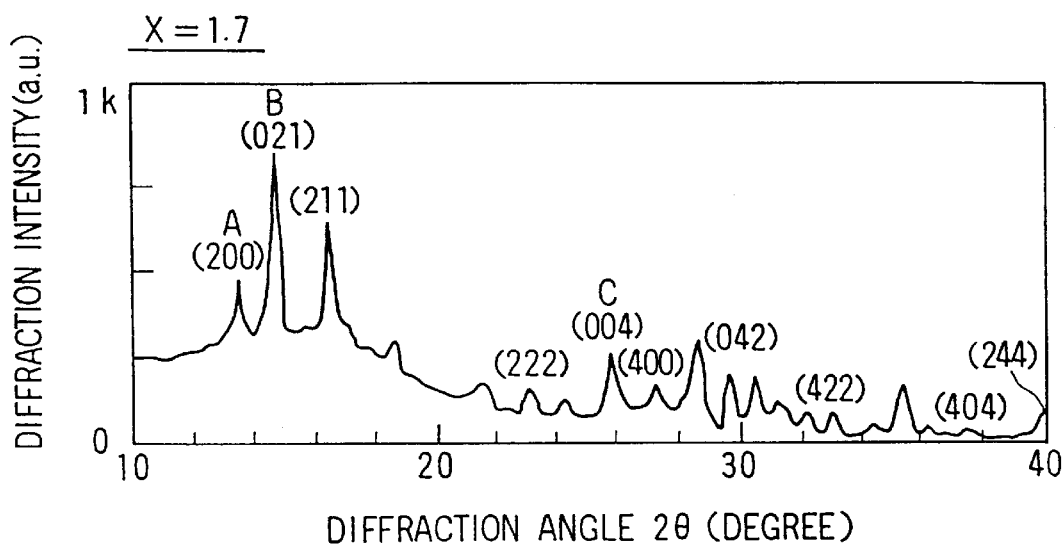
FIG. 8A is a drawing illustrating an X-ray diffraction spectrum of the luminescent layer in the first embodiment.
Figure 8B:
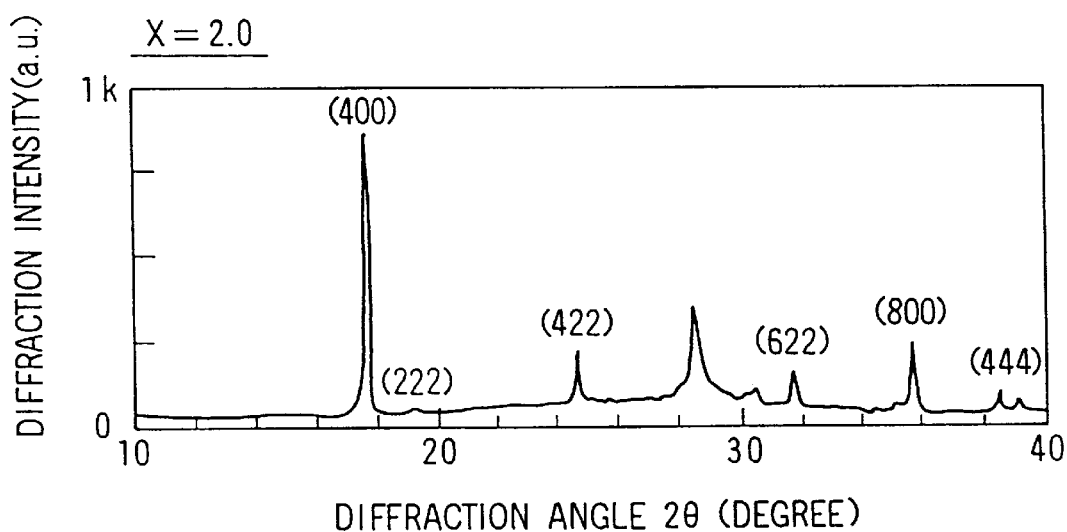
FIG. 8B is a drawing illustrating an X-ray diffraction spectrum of a conventional device.

Also, X-ray diffraction spectrums with respect to the luminescent layer having a composition ratio of X=1.7 and Y=3.5 and the luminescent layer having a composition ratio of X=2.0 and Y=4.0 are illustrated in FIGS. 8A and 8B, respectively. Incidentally, in the measurement of the X-ray diffraction spectrum, Cu Kα radiation is used as an X-ray source.

From an analysis of the X-ray diffraction spectrum illustrated in FIGS. 8A and 8B, it is ascertained that, in the luminescent layer having a composition rate of X=2.0 and Y=4.0 as shown in FIG. 8B, $CaGa_2S_4$ crystal which has been well known and is described in a card of #25-0134 of the JCPDS (Joint Committee Powder Diffraction Standards) has grown. On the other hand, in the luminescent layer having a composition rate of X=1.7 and Y=3.5, there is grown a crystal exhibiting diffraction peaks at least at 13.5±0.2 degree (peak A), 14.6±0.2 degree (peak B) and 25.7±0.2 degree (peak C) of the X-ray diffraction spectrum. The crystal exhibiting such an X-ray diffraction spectrum, however, has not been described in published documents such as the JCPDS card, that is, has been unknown before. Therefore, this crystal is new blue light emitting material found by the present inventors.

As a result of the analysis with respect to the crystal, while a well-known $CaGa_2S_4$ crystal has a lattice constant of a=2.01 nm, b=2.01 nm and c=1.21 nm concerning a length of an unit lattice, i.e., a lattice constant, the blue light emitting material according to the first embodiment has a lattice constant of a=1.32 nm, b=1.34 nm and c=1.38 nm. It was thus ascertained that the crystal of the blue light emitting material is completely different from the well-known $CaGa_2S_4$ crystal. It is to be noted that α, β and γ in the lattice constant meet a condition of α=β=γ=90° in both the crystal of the blue light emitting material of the first embodiment and the conventional $CaGa_2S_4$ crystal.

As described above, when a, b and c in the lattice constant substantially become equal to one another (a≈b≈c), anisotropy of interaction between the luminescent center and electrons becomes small. As a result, because excitation efficiency is not practically affected by a flowing direction of the electrons, emitting light of high luminance can be obtained.

Also, indexes of plane which correspond to each of the peaks of the X-ray diffraction spectrum by using the lattice constant are illustrated in FIGS. 8A and 8B.

Further, it was ascertained from the experiments conducted by the present inventors that the blue light emitting material according to the first embodiment grows only when the composition rate of the $CaGa_XS_Y:Ce$ luminescent layer 5 is in the range of $1.4 \leq X \leq 1.9$, $2.9 \leq Y \leq 3.8$. Therefore, in FIG. 7, the range of the composition rate in which high luminance can be obtained coincides with the range of the composition rate in which the blue light emitting material according to the first embodiment grows. In the above range of the composition rate, a, b and c in the lattice constant substantially become equal to one another ($a \approx b \approx c$) as described above. It is to be noted that, although a magnitude of each of peaks A, B and C varies, at least a peak of the X-ray diffraction spectrum exists at each of the diffraction angles described above.

Figure 9:
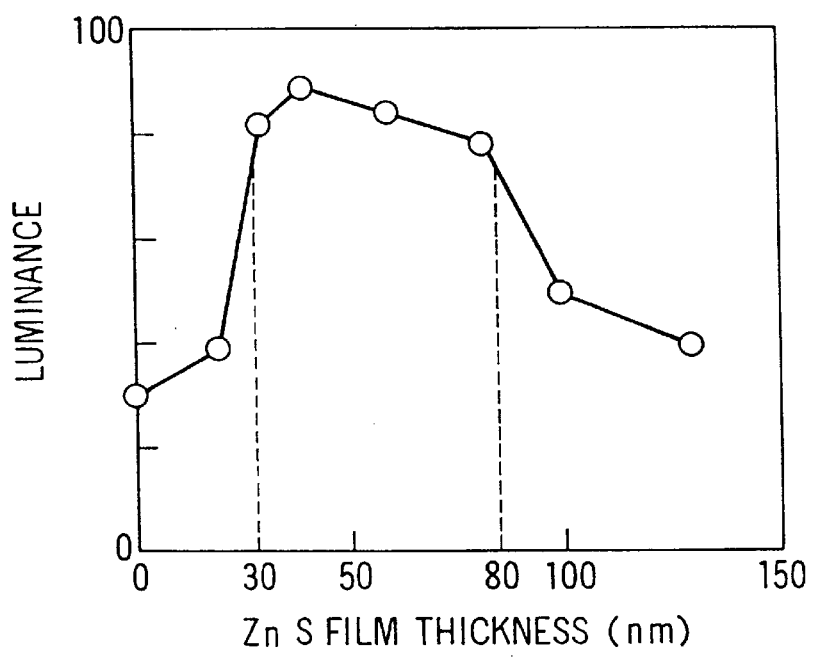
FIG. 9 is a graph illustrating a relationship between a luminance of blue light emission and a thickness of a ZnS layer in the first embodiment of the present invention.

Next, dependence of luminance of emitting blue light on thicknesses of the first ZnS layer 4 and the second ZnS layer 6 is illustrated in FIG. 9. When the thicknesses of the first ZnS layer 4 and the second ZnS layer 6 is caused to be equal to each other and these thicknesses are set to be in a range of not less than 30 nm nor more than 80 nm, it is understood from FIG. 9 that high luminance blue light emission can be obtained. As a reason of high luminance, it is considered that the first and second ZnS layers 4 and 6 function as good Zn diffusion sources to the luminescent layer 5 when the thicknesses thereof is in the range of not less than 30 nm nor more than 80 nm.

Figure 10A:
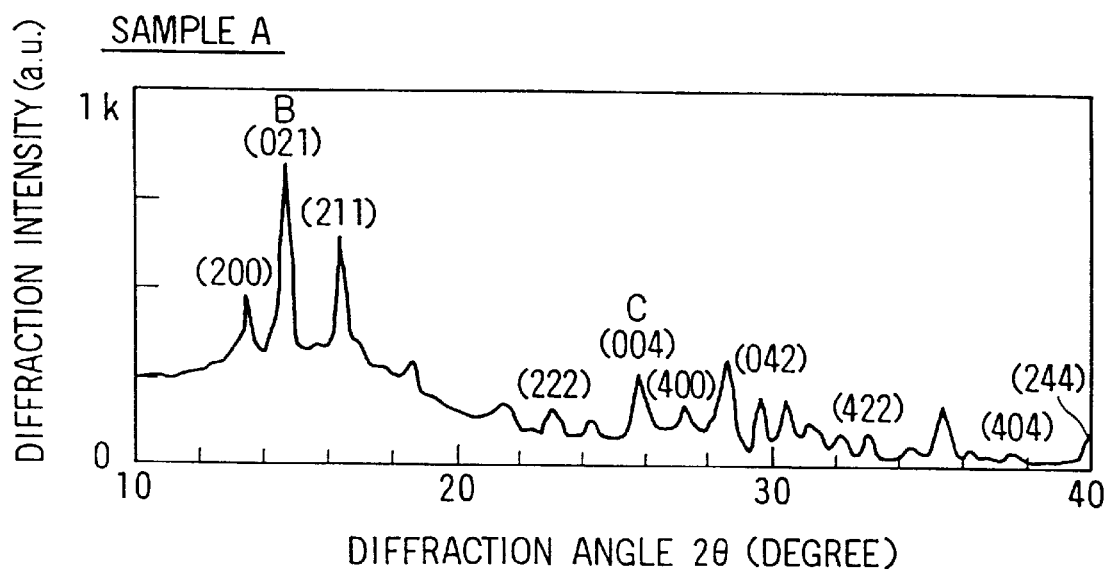
FIG. 10A is a drawing illustrating an X-ray diffraction spectrum of a luminescent layer according to the first embodiment of the present invention.
Figure 10B:
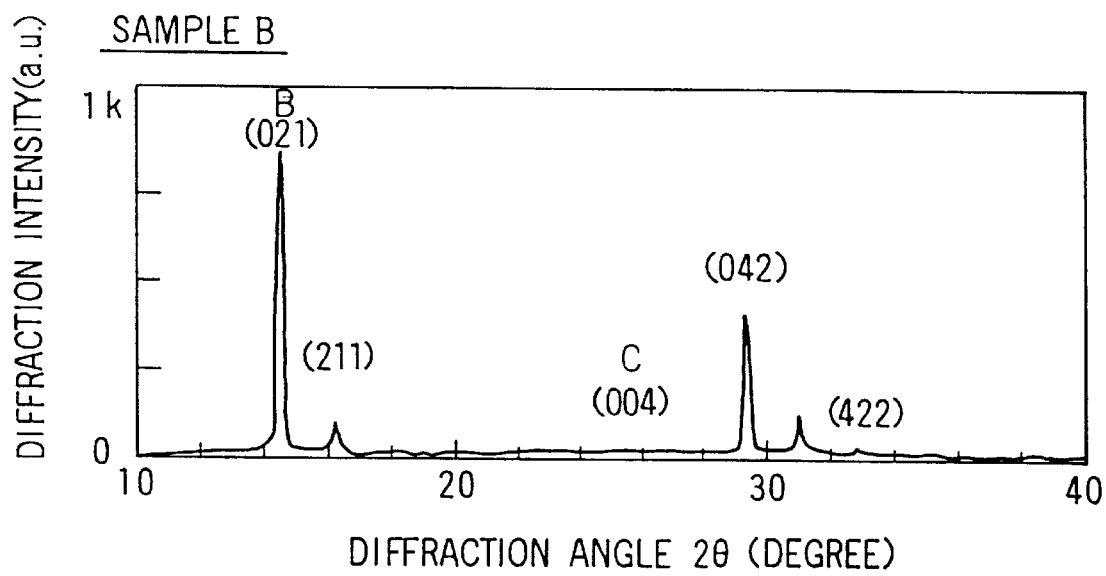
FIG. 10B is a drawing illustrating an X-ray diffraction spectrum of a luminescent layer when a ZnS layer is not provided.
Figure 11:
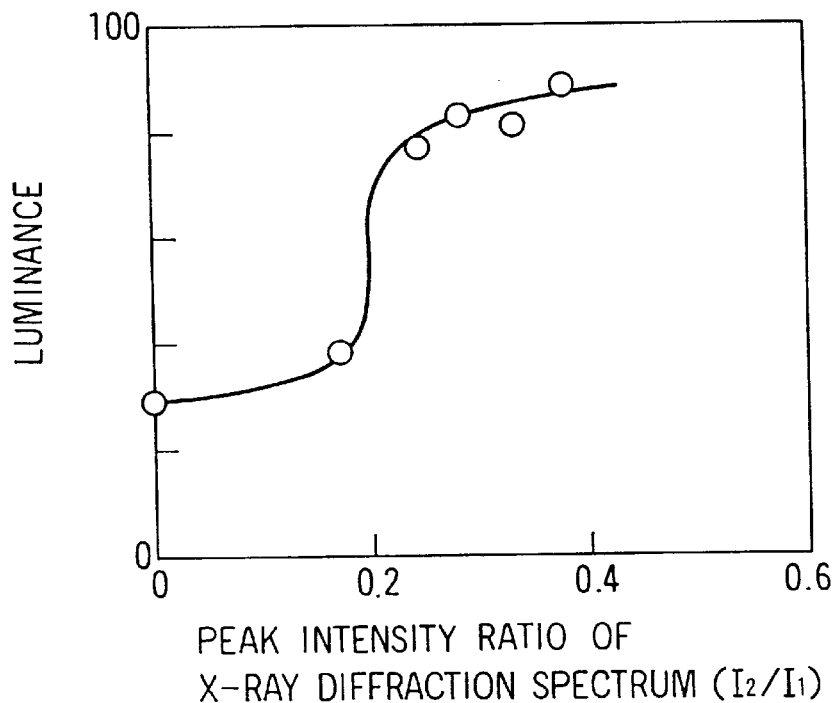
FIG. 11 is a graph illustrating a relationship between a luminance of blue light emission and a ratio $(I_2/I_1)$ of intensity $I_2$ of a peak at 25.7±0.2 degree of the X-ray diffraction spectrum relative to intensity $I_1$ of a peak at 14.6±0.2 degree of the X-ray diffraction spectrum in the first embodiment.

FIGS. 10A and 10B each illustrate X-ray diffraction spectrum of a $CaGa_XS_Y:Ce$ luminescent layer 5 ($1.4 \leq X \leq 1.9$, $2.9 \leq Y \leq 3.8$) in a device (sample A) in which a thickness of the ZnS layer is 40 nm and in a device (sample B) in which the ZnS layer is not provided. As shown in FIGS. 10A and 10B, a ratio ($I_2/I_1$) of intensity $I_2$ of a peak (peak C) of the diffraction spectrum at $25.7 \pm 0.2$ degree relative to intensity $I_1$ of a peak (peak B) of the diffraction spectrum at $14.6 \pm 0.2$ degree varies depending on the presence or absence of the ZnS layer. FIG. 11 shows the relationship between luminance of emitting blue light and the ratio $I_2/I_1$. As understood from FIG. 11, when the ratio $I_2/I_1$ is equal to or higher than a value of 0.2, higher luminance of emitting blue light can be obtained.

Figure 12:
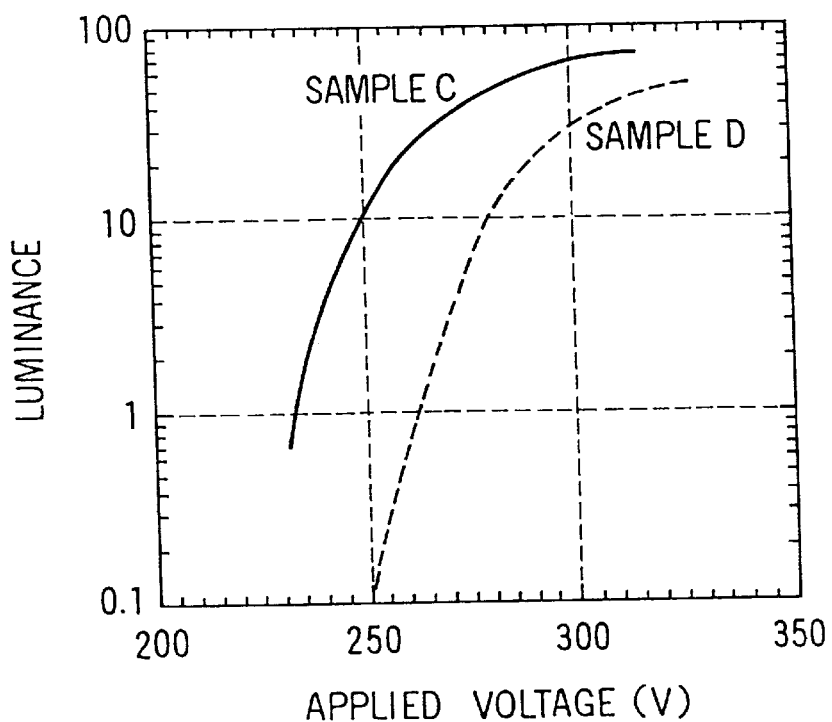
FIG. 12 is a graph illustrating a relationship between the timings of annealing treatment and light emission characteristics.

It is preferable that annealing treatment is performed after forming the second insulating layer 7. FIG. 12 shows the relationship between luminance characteristics and the timings of the annealing treatment. In FIG. 12, while in a sample C the annealing treatment is performing after forming the second insulating layer 7, in a sample D the annealing treatment is performed after forming the second ZnS layer 6. A threshold voltage to cause the sample C to emit light is lower by approximately 30 V than a threshold voltage to cause the sample D to emit light. That is, the sample C can be driven by a lower voltage.

Further, it was ascertained that an optimal thickness of the luminescent layer is in a range of not less than 300 nm nor more than 700 nm. When the thickness of the luminescent layer was less than 300 nm, the luminance of emitting blue light remarkably dropped. On the other hand, when exceeding 700 nm, pealing of the luminescent layer occurred, thereby deteriorating the reliability of the device.

Furthermore, when the concentration of the luminescent center doped in the luminescent layer is in a range of not less than 0.2 at % not more than 3.0 at % relative to a total number of atoms of Ca, Ga and S, higher luminance of emitting blue light can be achieved.

It is to be noted that, although the luminescent center doped in the luminescent layer is Ce in the first embodiment, it is considered that Eu or Pb can be adopted instead of Ce.

Also, in the first embodiment, there are formed the first and second ZnS layers 4 and 6 at both sides of the luminescent layer 5. However, if at least one ZnS layer is provided adjacent to the luminescent layer 5, a Zn diffusion region is formed in the luminescent layer 5, thereby obtaining an effect of enhancing the luminance of emitting blue light.

(Second Embodiment)

In a second embodiment, the first and second ZnS layers 4 and 6 are not formed, unlike the first embodiment. Instead, the $CaGa_XS_Y:Ce$ luminescent layer 5 ($1.4 \leq X \leq 1.9$, $2.9 \leq Y \leq 3.8$) is formed by a chemical vapor deposition method, and simultaneously, Zn is directly doped in the luminescent layer 5 in the vicinity of interfaces with the first and second insulating layers 3 and 7.

A manufacturing method of the electroluminescent device according to the second embodiment will be described hereinafter.

In the same manner as the first embodiment, the first transparent electrode 2 made of ITO and the first insulating layer 3 made of ATO are formed on the glass substrate 1.

Figure 13:
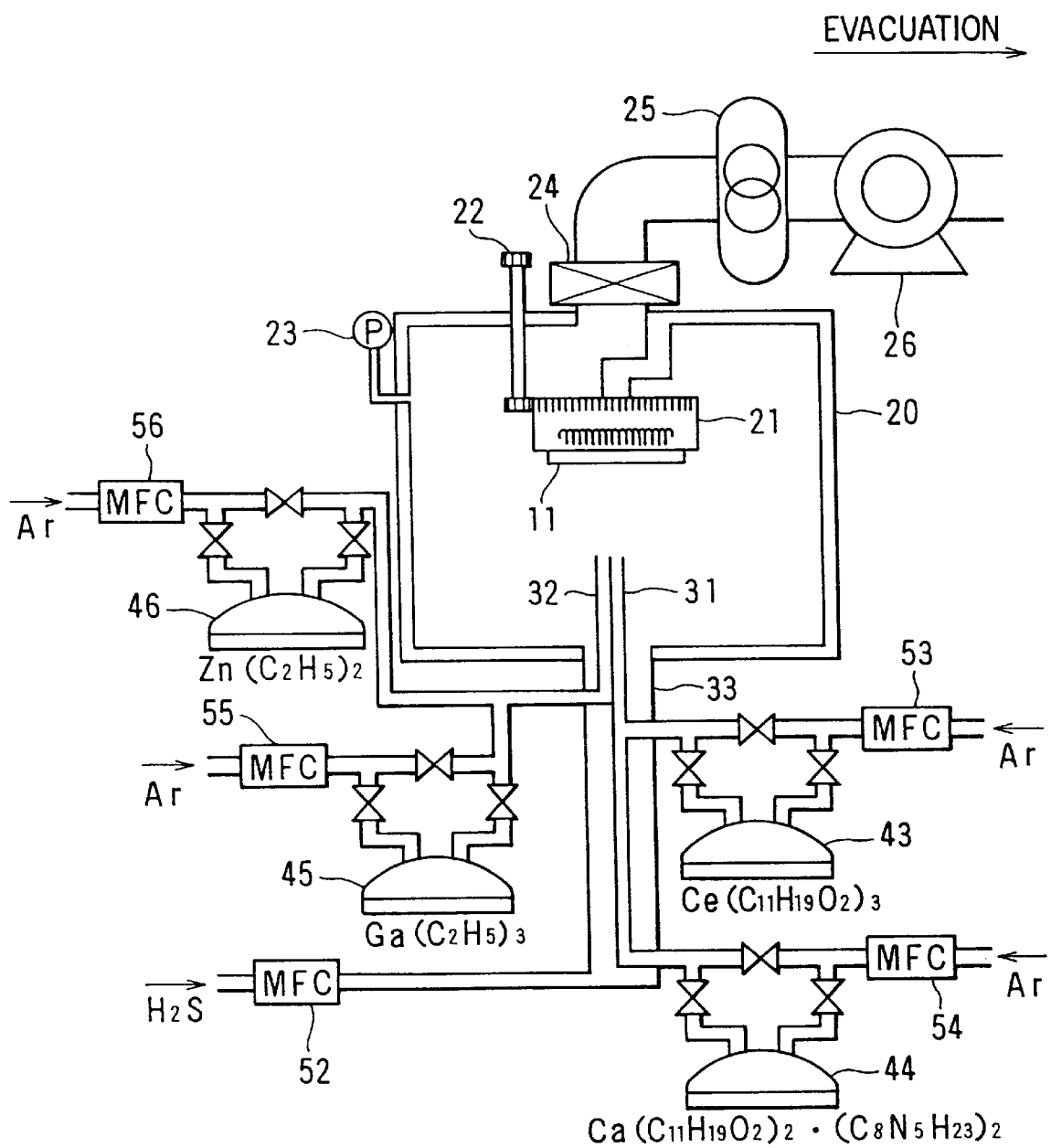
FIG. 13 is a schematic view illustrating an example of configuration of a manufacturing apparatus according to the second embodiment of the present invention.

Next, the $CaGa_XS_Y:Ce$ luminescent layer 5 ($1.4 \leq X \leq 1.9$, $2.9 \leq Y \leq 3.8$) in which Zn will be partially doped is formed on the first insulating layer 3 by an MOCVD method with the use of an MOCVD apparatus illustrated in FIG. 13.

In this MOCVD apparatus, a gas system to supply Zn precursor into the reactor 20 is added to the apparatus used in the first embodiment. A piping for transmitting Zn precursor is merged with a piping for Ga precursor and then both precursors are supplied into the reactor 20 from the nozzle 32. Because both Zn precursor and Ga precursor have alkyl radical ($C_2H_5$), they do not react to each other. It is to be noted that if the piping for transmitting Zn precursor is merged with the other piping, there arises a problem that precursors react to each other in the piping. The shapes of the nozzles are the same as those illustrated in FIG. 4.

In more detail, the glass substrate 11 is set on the susceptor 21 (illustrated in FIG. 13) of which rotational speed can be controlled after the first insulating layer 3 is formed. The susceptor 21 is rotated at 5 rpm through the rotation controlling stick 22. Thereafter, while the temperature of the glass substrate 11 is kept to a constant temperature of 534° C., an evacuated quantity is controlled by a pressure adjusting device (not shown) so that the inside of the reactor (film-formation chamber) 20 becomes a pressure-reduced atmosphere of 50 Torr, which is detected by the pressure gage 23. Evacuation of gas is performed by the rotary pump 26 and the mechanical booster pump 25 through the gate valve 24.

Thereafter, in addition to each of $Ca(thd)_2$-tetraethylenepentamine adduct ($Ca(c_{11}H_{19}O_2)_2$ ($C_8N_5H_{23})_2$), triethylgallium ($Ga(C_2H_5)_3$), hydrogen sulfide ($H_2S$) and $Ce(thd)_3$, diethylzinc ($Zn(C_2H_5)_2$) are introduced in the reactor 20 in an initial stage of the formation of the luminescent layer, whereby a $CaGa_XS_Y:Ce$ luminescent layer having Zn doped therein is formed by a thickness of 100 nm. Next, while the supply of diethylzinc ($Zn(C_2H_5)_2$) is stopped, the luminescent layer is formed by a thickness of 350 nm. Then, the luminescent layer is formed by a thickness of 100 nm after the supply of ($Zn(C_2H_5)_2$) is resumed. As a result, a Zn doping region as shown in FIG. 6 can be formed.

At this time, a solid material container 44 containing $Ca(thd)_2$-tetraethylenepentamine adduct ($Ca(c_{11}H_{19}O_2)_2 \cdot (C_8N_5H_{23})_2$) is insulated at a constant temperature of 185° C. Also, a liquid material container 46 containing diethylzinc ($Zn(C_2H_5)_2$) is insulated at a constant temperature of 10° C.

Supplying amount of each precursor is controlled so that the values of X and Y in the $CaGa_XS_Y$ luminescent layer 5 in which Zn is partially doped therein fall in ranges such as $1.4 \leq X \leq 1.9$, $2.9 \leq Y \leq 3.8$.

Next, the second insulating layer 7 made of an ATO layer is formed in the same manner as that of the first embodiment. Thereafter, the glass substrate 11 is subject to annealing treatment in the same manner as that of the first embodiment. Further, the second transparent electrode 8 made of ZnO is formed on the second insulating layer 7 in the same manner as that of the first embodiment.

The thicknesses of the first transparent electrode 2, the first and second insulating layers 3 and 7, the luminescent layer 5, and the second transparent electrode 8 are 200 nm, 300 nm, 550 nm and 450 nm, respectively.

In the second embodiment, blue light emitting material which is completely different from the conventional $CaGa_2S_4$:Ce grows in the same way as the first embodiment and high luminance blue light emission can be obtained just as shown in FIG. 7. In addition, because the formation of the luminescent layer and the doping of Zn can be simultaneously executed, manufacturing steps for the ZnS layers in the first embodiment can be omitted thereby lowering the manufacturing cost therefor.

It is to be noted that the blue light emitting material described above can be utilized for fluorescent substance of a fluorescent display, a plasma-display and a field emission display (FED) in addition to the electroluminescent device.

What is claimed is:

1. A blue light emitting material, comprising:

a host material in which calcium (Ca), gallium (Ga), and sulfur (S) are main comonents; and cerium (Ce) doped as a luminescent center in the host material, wherein an X-ray diffraction spectrum of said blue light emitting material in a case in which Cu Kα radiation is used as an X-ray source has at least one peak in diffraction angles of 13.5±0.2 degrees, 14.6±0.2 degees, and 25.7±0.2 degrees, and wherein, when a chemical formula of said host material is expressed in a form of $CaGa_XS_Y$, X is in a range of from not less than 1.4 to not more than 1.9 and Y is in a range of from not less than 2.9 to not more than 3.8.

2. A blue light emitting material comprising:

a host material in which calcium (Ca), gallium (Ga) and sulfur (S) are main components; and cerium (Ce) which is doped as a luminescent center in the host material, wherein, when a chemical formula of said host material is expressed in a form of $CaGa_XS_Y$, a range of X is not less than 1.4 nor more than 1.9 and a range of Y is not less than 2.9 nor more than 3.8.

* * * * *